No. 760,708. PATENTED MAY 24, 1904.
C. S. SHARP.
DISK HARROW TRUCK.
APPLICATION FILED NOV. 30, 1903.
NO MODEL.
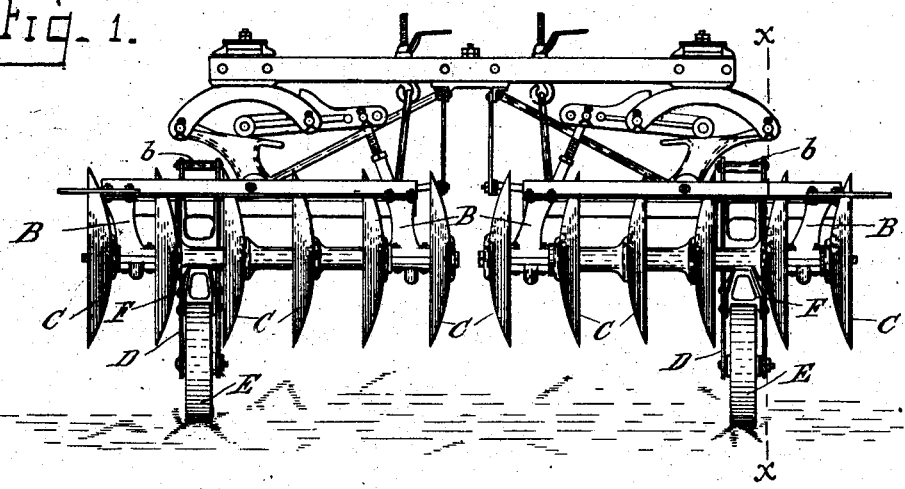
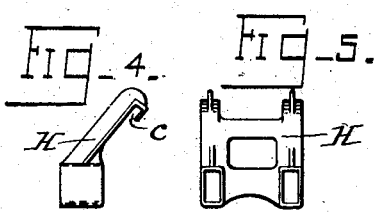
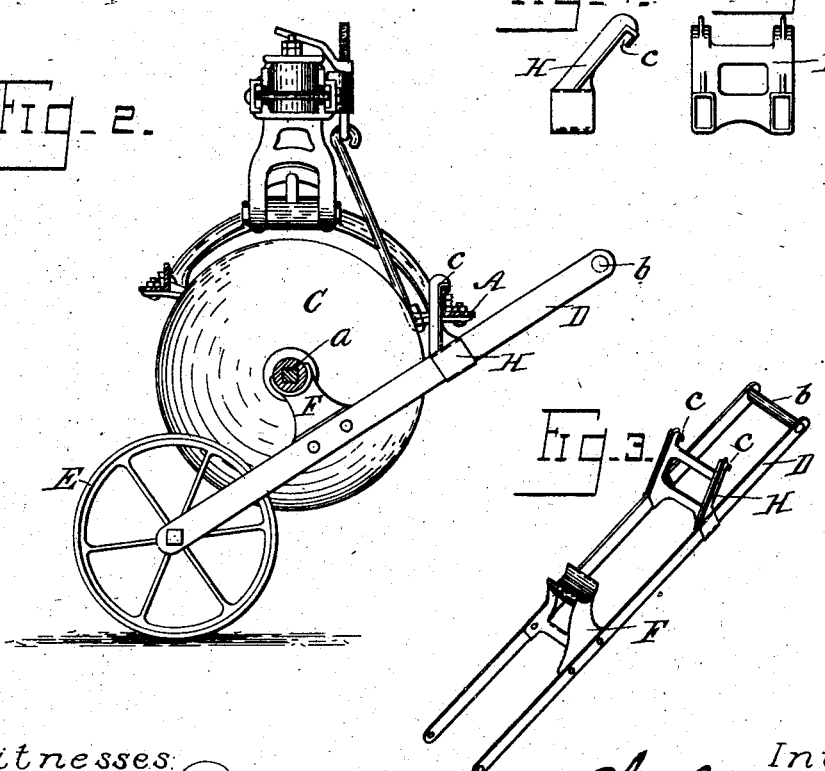
Witnesses
Inventor:
Charles S. Sharp
by W. C. Jindiwston
his Attorney.

No. 760,708. Patented May 24, 1904.

UNITED STATES PATENT OFFICE.

CHARLES S. SHARP, OF AUBURN, NEW YORK, ASSIGNOR TO D. M. OSBORNE & COMPANY, OF AUBURN, NEW YORK, A CORPORATION OF NEW YORK.

DISK-HARROW TRUCK.

SPECIFICATION forming part of Letters Patent No. 760,708, dated May 24, 1904.

Application filed November 30, 1903. Serial No. 183,167. (No model.)

*To all whom it may concern:*

Be it known that I, CHARLES S. SHARP, a citizen of the United States, residing at Auburn, in the county of Cayuga and State of New York, have invented certain new and useful Improvements in Disk-Harrow Trucks, of which the following is a full, clear, and exact description.

The object of my invention is to provide a truck for disk harrows that can be readily attached and detached.

Referring to the accompanying drawings, Figure 1 is a rear elevation of a disk harrow, showing the trucks in position. Fig. 2 is a side view of the same in section on line $xx$ of Fig. 1. Fig. 3 is a perspective view of the frame of the truck. Figs. 4 and 5 are views of the clamp.

A is the front frame-bar of the harrow, secured to the brackets B, in which are journaled the axles $a$ of the disks C, the spacing-spools and square axle-bar being considered integral for the purpose of this description.

D is the frame of the truck; E, the wheel; F, a support on which the harrow rests when the truck is in use and to which the frame D is rigidly fastened. The front end of the frame D has a grip-piece $b$, and between it and the support is the clamp H, through which the bars of the frame D pass. The clamp H is readily movable along the bars of the frame D, so as to permit of the attachment of the truck or of its detachment and also to accommodate harrows of different widths of frame. The hooks $c$ hold the clamp on the frame-bar and retain the truck in position.

In order to attach the truck, it is drawn beneath the harrow and between the disks until the support F is directly beneath the axle of the harrow. The front of the truck-frame is then lifted, bringing the support in contact with the axle and raising the harrow from the ground. When the truck-frame has been raised to a sufficient height, the clamp is moved up until the hooks $c$ thereon are directly over the frame-bar A, when the front end of the truck is lowered and the hooks $c$ brought into engagement with the bar A, being held firmly in position by the weight of the harrow.

When it is desired to detach the harrow, the front of the truck-frame is lifted and the clamp disengaged from the frame-bar A. The truck-frame is then lowered until the harrow rests upon the ground, when the truck can be pushed to the rear and from under the harrow or the latter can be drawn from over the truck.

I do not limit myself to the precise construction of the clamp as shown, as it can be readily seen that the clamp can be shaped to grasp any shape of bar used as the frame-bar of a disk harrow.

Having thus fully described my invention, what I claim as new, and desire to secure by Letters Patent, is—

1. A removable truck for disk harrows or the like comprising a frame, a wheel at one end thereof, a support for the harrow, and a clamp movable on the frame to adapt it to engage with the harrow-frame bar.

2. A removable truck for disk harrows or the like, comprising a frame having a wheel at one end, a support for the harrow, and an adjustable clamp carried by the frame to engage with the harrow-frame to hold the truck in position.

3. A removable truck for disk harrows or the like, comprising a frame having a wheel at one end, a support for the harrow, and a sliding clamp on the frame to engage with the frame of the harrow to hold the truck in position.

4. A removable truck for disk harrows or the like, comprising a frame, a wheel at one end, a support for the harrow on the frame, a grip to move the truck in or out of position, and a clamp on the truck-frame to engage with the harrow-frame, the weight of the harrow holding the truck in position.

In testimony whereof I hereunto set my hand, this 19th day of November, 1903, in the presence of two attesting witnesses.

CHARLES S. SHARP.

Witnesses:
  JAMES LATTIMORE,
  HOWARD R. HAWKINS.